US010964002B2

(12) United States Patent
Senzaki

(10) Patent No.: US 10,964,002 B2
(45) Date of Patent: Mar. 30, 2021

(54) IMAGE PROCESSING METHOD, IMAGE PROCESSING APPARATUS AND IMAGE PROCESSING PROGRAM

(71) Applicant: NEC Corporation, Tokyo (JP)

(72) Inventor: Kenta Senzaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 28 days.

(21) Appl. No.: 16/345,278

(22) PCT Filed: Nov. 8, 2016

(86) PCT No.: PCT/JP2016/083061
§ 371 (c)(1),
(2) Date: Apr. 26, 2019

(87) PCT Pub. No.: WO2018/087806
PCT Pub. Date: May 17, 2018

(65) Prior Publication Data
US 2019/0295233 A1 Sep. 26, 2019

(51) Int. Cl.
G06K 9/00 (2006.01)
G06T 5/50 (2006.01)
(Continued)

(52) U.S. Cl.
CPC .............. G06T 5/50 (2013.01); G06T 5/002 (2013.01); H04N 1/40 (2013.01); H04N 5/217 (2013.01);
(Continued)

(58) Field of Classification Search
CPC . G06T 5/50; G06T 5/002; G06T 2207/10016; G06T 2207/20024;
(Continued)

(56) References Cited

U.S. PATENT DOCUMENTS 5,805,721 A * 9/1998 Vuylsteke ............... G06T 5/007
382/128
7,657,118 B2 * 2/2010 Aufranc ................. H04N 9/646
382/276
(Continued)

FOREIGN PATENT DOCUMENTS

JP 2007-034648 A 2/2007
JP 2009-010517 A 1/2009
(Continued)

OTHER PUBLICATIONS

International Search Report for PCT Application No. PCT/JP2016/083061, dated Feb. 14, 2017.
(Continued)

Primary Examiner — Jonathan S Lee

(57) ABSTRACT

An image processing apparatus 10 includes a first generation unit 11 which generates a plurality of lower-resolution images having different row-direction resolutions by changing a resolution in a row direction of an image to be processed to a plurality of lower resolutions, a second generation unit 12 which generates a differential image by taking a difference between two of the plurality of lower-resolution images, and a computation unit 13 which computes a correction amount for the pixel values of a predetermined column of the image to be processed by use of a statistical quantity of the pixel values of a predetermined column of the differential image.

20 Claims, 11 Drawing Sheets

(51) Int. Cl.
*G06T 5/00* (2006.01)
*H04N 5/365* (2011.01)
*H04N 5/357* (2011.01)
*H04N 1/40* (2006.01)
*H04N 5/217* (2011.01)

(52) U.S. Cl.
CPC ........... *H04N 5/357* (2013.01); *H04N 5/3658* (2013.01); *G06T 2207/10016* (2013.01); *G06T 2207/20024* (2013.01); *G06T 2207/20224* (2013.01)

(58) Field of Classification Search
CPC ............ G06T 2207/20224; H04N 1/40; H04N 5/217; H04N 5/357; H04N 5/3658
USPC ......................................................... 382/275
See application file for complete search history.

(56) References Cited

U.S. PATENT DOCUMENTS

| | | | |
|---|---|---|---|
| 8,208,026 B2 | 6/2012 | Hogasten et al. | |
| 8,253,818 B2 * | 8/2012 | Hiramoto | H04N 5/349 348/222.1 |
| 8,384,807 B2 * | 2/2013 | Yamada | H04N 5/37457 348/272 |
| 9,135,680 B2 * | 9/2015 | Menikoff | G06T 5/002 |
| 9,245,327 B2 * | 1/2016 | Menikoff | G06T 5/40 |
| 10,699,410 B2 * | 6/2020 | Pheiffer | G06T 7/0016 |
| 2009/0167956 A1 | 7/2009 | Miyazawa | |
| 2010/0289928 A1 | 11/2010 | Yano | |
| 2017/0287116 A1 | 10/2017 | Senzaki et al. | |

FOREIGN PATENT DOCUMENTS

| | | |
|---|---|---|
| JP | 2010-268225 A | 11/2010 |
| JP | 2015-090678 A | 5/2015 |
| JP | 2015-177244 A | 10/2015 |
| WO | 2016/051716 A1 | 4/2016 |

OTHER PUBLICATIONS

Japanese Office Action for JP Application No. 2018-549652 dated Jun. 2, 2020 with English Translation.

* cited by examiner

IMAGE PROCESSING METHOD, IMAGE PROCESSING APPARATUS AND IMAGE PROCESSING PROGRAM

This application is a National Stage Entry of PCT/JP2016/083061 filed on Nov. 8, 2016, the contents of all of which are incorporated herein by reference, in their entirety.

TECHNICAL FIELD

The present invention relates to an image processing method, an image processing apparatus, and an image processing program.

BACKGROUND ART

Techniques for suppressing noise included in an image are used, not only to allow an imaged object to be reproduced more clearly in the captured image, but also to prevent noise emphasis in various image processing. That is to say, the noise suppression technique is a most indispensable technique among the image processing techniques.

Correction processing called non-uniformity correction (NUC) is a kind of noise suppression technique which suppresses fixed pattern noise (FPN) caused by non-uniformity of sensitivity among image pickup elements.

In the NUC widely used, a shutter is disposed in front of the sensor in a camera. The shutter surface is imaged periodically to estimate FPN, and the estimated FPN is subtracted from the captured image. That is to say, when known values such as setting values are used as the pixel values of the shutter surface, imaging the shutter surface just one time enables the FPN to be estimated with high accuracy.

However, the above-described method poses problems that no scene information can be obtained during several frames in which the shutter is closed, that the chassis becomes large due to implementation of the mechanical structure, that the production cost increases, and that the breakdown increases. Therefore, research and development have been promoted on a way of estimating the FPN by using a captured image alone.

Patent Literature (PTL) 1 describes an exemplary way of estimating the FPN by using only a captured image. The method described in PTL 1 is a method of estimating FPN occurring in a column direction or a row direction of an image by using only one image captured, and suppressing the estimated FPN.

Column noise is noise that has a same offset value in the column direction of the image. When a true value of scene information is represented as x and a pixel value of the captured image as y, the pixel value y(i,j) in a position (i,j) within the image including column noise is expressed by the following expression (1) by using the offset value $\beta_{col}(j)$ in the j-th column of the image.

$$y(i,j)=x(i,j)+\beta_{col}(j) \qquad \text{Expression (1)}$$

It should be noted that row noise is expressed by replacing the "column" in the definition of the column noise with "row". That is to say, the pixel value y(i,j) in a position (i,j) within the image including row noise is expressed by the following expression (2) by using the offset value $\beta_{row}(i)$ in the i-th row of the image.

$$y(i,j)=x(i,j)+\beta_{row}(i) \qquad \text{Expression (2)}$$

The method described in PTL 1 performs noise suppressing processing for each column independently. Firstly, a column to be processed is selected from an input image. Next, a row within the target column is selected arbitrarily, and a differential value between the pixel at the center and its neighboring pixel in the row direction is computed. Such computation of the differential value between the pixel at the center and its neighboring pixel is performed repeatedly for all the rows in the target column.

Subsequently, the method described in PTL 1 obtains a statistical quantity of the obtained differential values, and estimates the obtained statistical quantity as the column noise in the target column. The statistical quantity obtained is a median, for example.

The method described in PTL 1 performs the above processing repeatedly on all the columns in the input image. Lastly, the method described in PTL 1 subtracts the estimated column noise from the input image to correct the image in the target column. The column noise suppressing processing is finished once the images in all the columns are corrected.

Further, the method described in PTL 1 can suppress column noise at various frequencies by repeatedly performing the above processing while changing the reference range (hereinafter, referred to as reference pixel range) of neighboring pixels for which the differential computation is to be performed.

It should be noted that row noise suppressing processing performed by the method described in PTL 1 corresponds to the above-described column noise suppressing processing with "column" and "row" being replaced with "row" and "column", respectively.

CITATION LIST

Patent Literature

PTL 1: U.S. Pat. No. 8,208,026

SUMMARY OF INVENTION

Technical Problem

However, when the method described in PTL 1 is used, the cost of computing the differences of pixel values will increase as the reference pixel range is enlarged. Further, as the reference pixel range is enlarged, the cost of generating histograms concerning the differences of pixel values between the columns and the cost of generating histograms concerning the differences of pixel values between the rows will increase.

Furthermore, in order to effectively remove column noise and row noise at various frequencies, the noise estimating processing and suppressing processing will have to be performed repeatedly while changing the reference pixel range. That is to say, the computational costs for the entire noise removal will increase.

Therefore, there is a need for a technique that can effectively suppress column noise and row noise at various frequencies with lower computational costs.

Object of Invention

In view of the foregoing, an object of the present invention is to provide an image processing method, an image processing apparatus, and an image processing program solving the above-described problem which are capable of suppressing column noise at various frequencies with low computational costs.

Solution to Problem

An image processing method according to the present invention includes: generating a plurality of lower-resolution images having different row-direction resolutions by changing a resolution in a row direction of an image to be processed to a plurality of lower resolutions; generating a differential image by taking a difference between two of the plurality of lower-resolution images; and computing a correction amount for the pixel values of a predetermined column of the image to be processed by use of a statistical quantity of the pixel values of a predetermined column of the differential image.

An image processing apparatus according to the present invention includes: a first generation unit configured to generate a plurality of lower-resolution images having different row-direction resolutions by changing a resolution in a row direction of an image to be processed to a plurality of lower resolutions; a second generation unit configured to generate a differential image by taking a difference between two of the plurality of lower-resolution images; and a computation unit configured to compute a correction amount for the pixel values of a predetermined column of the image to be processed by use of a statistical quantity of the pixel values of a predetermined column of the differential image.

An image processing program according to the present invention causes a computer to perform: first generation processing of generating a plurality of lower-resolution images having different row-direction resolutions by changing a resolution in a row direction of an image to be processed to a plurality of lower resolutions; second generation processing of generating a differential image by taking a difference between two of the plurality of lower-resolution images; and computation processing of computing a correction amount for the pixel values of a predetermined column of the image to be processed by use of a statistical quantity of the pixel values of a predetermined column of the differential image.

Advantageous Effects of Invention

According to the present invention, it is possible to suppress column noise at various frequencies with low computational costs.

DESCRIPTION OF EMBODIMENTS

First Embodiment

[Description of Configuration]

An embodiment of the present invention will be described below with reference to the drawings.

(Image Processing Apparatus 1000 of First Embodiment)

Figure 1:
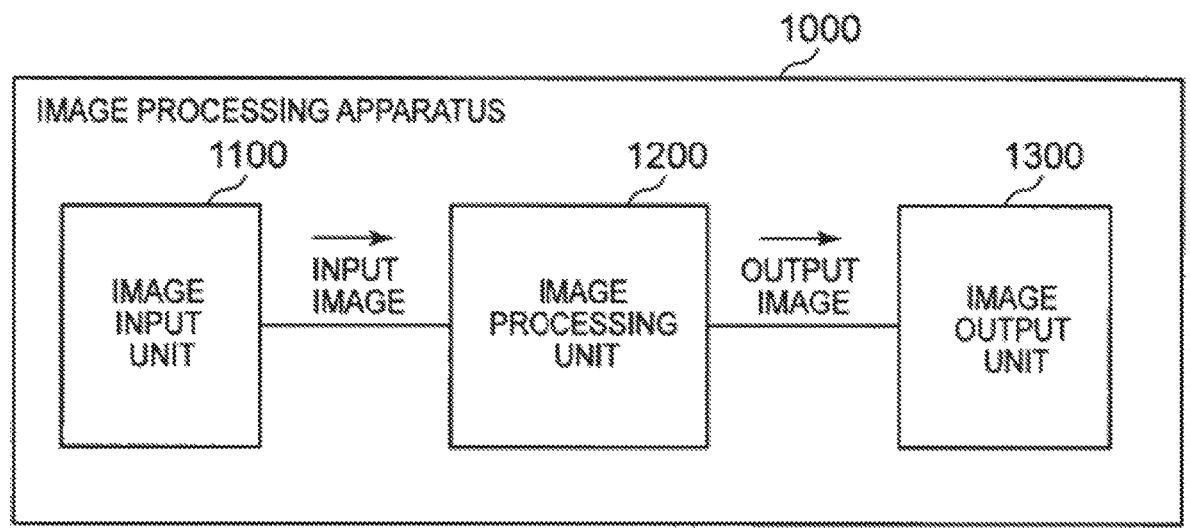
FIG. 1 is a block diagram showing an exemplary configuration of a first embodiment of the image processing apparatus according to the present invention.

FIG. 1 is a block diagram showing an exemplary configuration of the first embodiment of the image processing apparatus according to the present invention. As shown in FIG. 1, the image processing apparatus 1000 of the present embodiment includes an image input unit 1100, an image processing unit 1200, and an image output unit 1300.

The image input unit 1100 has a function of inputting data on an image to be processed to the image processing unit 1200. The image input unit 1100 is an image pickup device such as a camera or a scanner, for example. The image input unit 1100 may be an image database in which data on the images captured by an image pickup device are accumulated.

Further, the image input unit 1100 may be configured with an image pickup device and an image database communicably connected to the image pickup device via a communication network. The image input unit 1100 inputs data on an original image to the image processing unit 1200.

The image processing unit 1200 has a function of performing fixed pattern noise suppressing processing on the input data on the original image. The image processing unit 1200 inputs a noise-suppressed image, generated as a result of the fixed pattern noise suppressing processing, to the image output unit 1300.

The image output unit 1300 has a function of outputting corrected data on the original image. The image output unit 1300 is an output device such as a display or a printer, for example. Alternatively, the image output unit 1300 is a storage medium such as a hard disk or a memory card storing the data on the images.

Further, the image output unit 1300 may be configured with an output device and a storage medium communicably connected to the output device via a communication network and storing the data on the images. The image output unit 1300 serves to display images, accumulate images, or transmit images.

Figure 2:
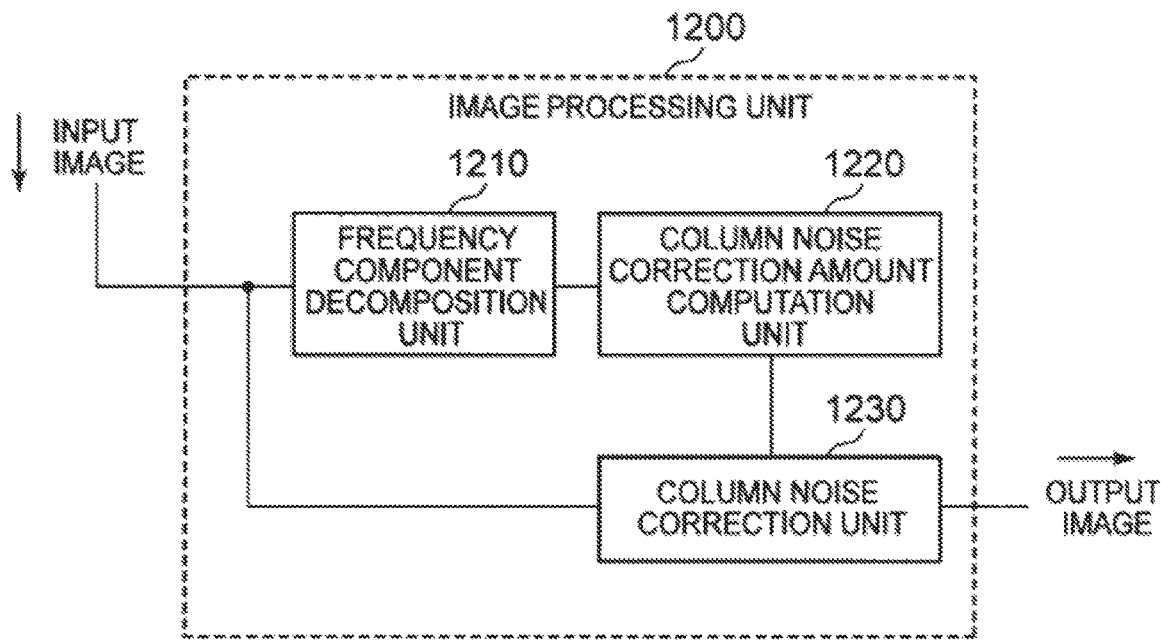
FIG. 2 is a block diagram showing an exemplary configuration of an image processing unit 1200 of the first embodiment.

FIG. 2 is a block diagram showing an exemplary configuration of the image processing unit 1200 of the first embodiment. As shown in FIG. 2, the image processing unit 1200 of the present embodiment includes a frequency component decomposition unit 1210, a column noise correction amount computation unit 1220, and a column noise correction unit 1230.

The frequency component decomposition unit 1210 has a function of decomposing frequency components included in an input image received from the image input unit 1100 into frequency bands (hereinafter, also referred to as bands).

The frequency component decomposition unit 1210 for example applies to horizontal frequency components included in the input image, a bandpass filter for decomposing the frequency components into at least two bands. The frequency component decomposition unit 1210 inputs frequency component images for the respective bands, obtained by applying the bandpass filter, to the column noise correction amount computation unit 1220.

The column noise correction amount computation unit 1220 has a function of computing column noise correction amounts for respective bands by using pixel values of the images of the frequency components included in the input image and decomposed into the respective bands, received from the frequency component decomposition unit 1210. The column noise correction amount computation unit 1220 inputs the computed column noise correction amounts to the column noise correction unit 1230.

The column noise correction unit 1230 has a function of correcting the input image by using the input image and the column noise correction amounts received from the column noise correction amount computation unit 1220. The column noise correction unit 1230 inputs the corrected input image, as an output image, to the image output unit 1300.

A description will now be given of the configurations and operations of the constituent elements of the image processing unit 1200 of the present embodiment.

(Frequency Component Decomposition Unit 1210)

Figure 3:
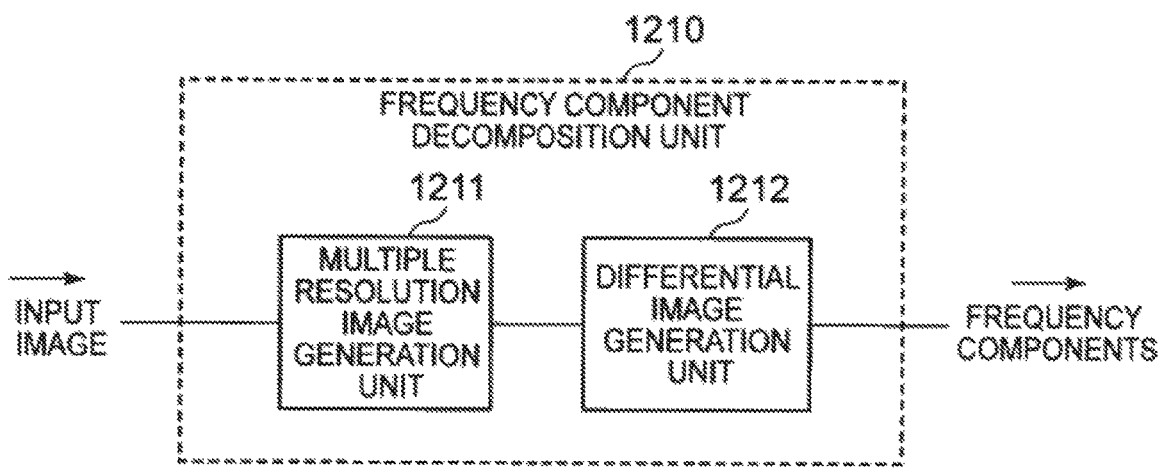
FIG. 3 is a block diagram showing an exemplary configuration of a frequency component decomposition unit 1210 of the first embodiment.

FIG. 3 is a block diagram showing an exemplary configuration of the frequency component decomposition unit 1210 of the first embodiment. As shown in FIG. 3, the frequency component decomposition unit 1210 of the present embodiment has a multiple resolution image generation unit 1211 and a differential image generation unit 1212.

(Multiple Resolution Image Generation Unit 1211)

The multiple resolution image generation unit 1211 has a function of generating a plurality of images different in resolution on the basis of an input image. The multiple resolution image generation unit 1211 applies a low-pass filter, for example, to the input image to generate a plurality of images of different resolutions. The multiple resolution image generation unit 1211 uses a moving average filter, for example, as the low-pass filter.

When the pixel value in a position (i,j) within an input image is represented as y(i,j) and the number of reference pixels of the n-th moving average filter (hereinafter, referred to as the filter n) as $T_n$, the pixel value $b_n(i,j)$ in the position (i,j) of a low frequency component image extracted when the filter n is used is expressed by the following expression (3).

[Math. 1]

$$b_n(i,j) = \frac{1}{T_n} \sum_{j-t_n \leq k \leq j+t_n} y(i,k), \text{ where}$$

$$t_n = \frac{T_n - 1}{2}$$

Expression (3)

The multiple resolution image generation unit 1211 of the present embodiment applies N moving average filters to the input image to generate N low frequency component images, respectively. The pixel values of the generated images are represented respectively as $b_0, b_1, \ldots, b_{N-1}$.

In the case of using the moving average filters for obtaining low frequency component images, the multiple resolution image generation unit 1211 may use an integral image $y_{int}$ for each row, obtained by the following expression (4).

[Math. 2]

$$y_{int}(i,j) = \sum_{0 \leq k \leq j} y(i,k)$$

Expression (4)

The pixel value $b_n(i,j)$ of the low frequency component image that is extracted when using a filter n for which the integral image $y_{int}$ in the row i is used is expressed by the following expression (5).

[Math. 3]

$$b_n(i,j) = \frac{1}{T_n}(y_{int}(i, j+t_n) - y_{int}(i, j-t_n-1))$$

Expression (5)

That is to say, by using the integral image $y_{int}$, the multiple resolution image generation unit 1211 is able to generate images of different resolutions at a computational cost of O(1) per pixel, irrespective of the reference pixel range adopted.

The multiple resolution image generation unit 1211 generates a plurality of images having different resolutions in the row direction by performing the computation processing shown in the expression (3) and the like for each filter. It should be noted that, when using an integral image, the multiple resolution image generation unit 1211 needs to generate the integral image only once when firstly applying a filter to the input image; it can reuse the generated integral image when applying another filter to the input image.

The multiple resolution image generation unit 1211 may use a weighted filter or a median filter as the low-pass filter, besides the moving average filter.

The multiple resolution image generation unit 1211 inputs the input image (pixel value y) and the obtained N low frequency component images (pixel values $b_0, b_1, \ldots, b_{N-1}$) to the differential image generation unit 1212.

(Differential Image Generation Unit 1212)

The differential image generation unit 1212 receives the input image (pixel value y) and the N low frequency component images (pixel values $b_0, b_1, \ldots, b_{N-1}$) from the multiple resolution image generation unit 1211. The differential image generation unit 1212 uses the received information to generate differential images.

For simplification of explanation, it is assumed that the N low frequency component images are arranged in descending order of passband of the low-pass filters applied.

That is to say, the N images are arranged in such a manner that the image with the pixel value of $b_{N-1}$ is made more blurred than the image with the pixel value of $b_0$.

The differential image generation unit 1212 computes the difference in pixel value between the images having the closest resolutions to generate N band-pass component images having different passbands (pixel values $d_0$, $d_1, \ldots, d_{N-1}$) as shown by the following expression (6).

[Math. 4]

$$d_n(i, j) = \begin{cases} y(i, j) - b_n(i, j) & n = 0 \\ b_{n-1}(i, j) - b_n(i, j) & \text{otherwise} \end{cases} \qquad \text{Expression (6)}$$

The input image and the N low frequency component images include frequency components whose bands are slightly different from each other. By computing the difference in pixel value between the images, the differential image generation unit 1212 is able to generate output results corresponding to the results of application of the band-pass filters.

Through the above processing, the frequency component decomposition unit 1210 is able to decompose the frequency components included in the input image into at least two bands. The differential image generation unit 1212 inputs the obtained N frequency component images (pixel values $d_0$, $d_1, \ldots, d_{N-1}$) to the column noise correction amount computation unit 1220.

(Column Noise Correction Amount Computation Unit 1220)

Figure 4:
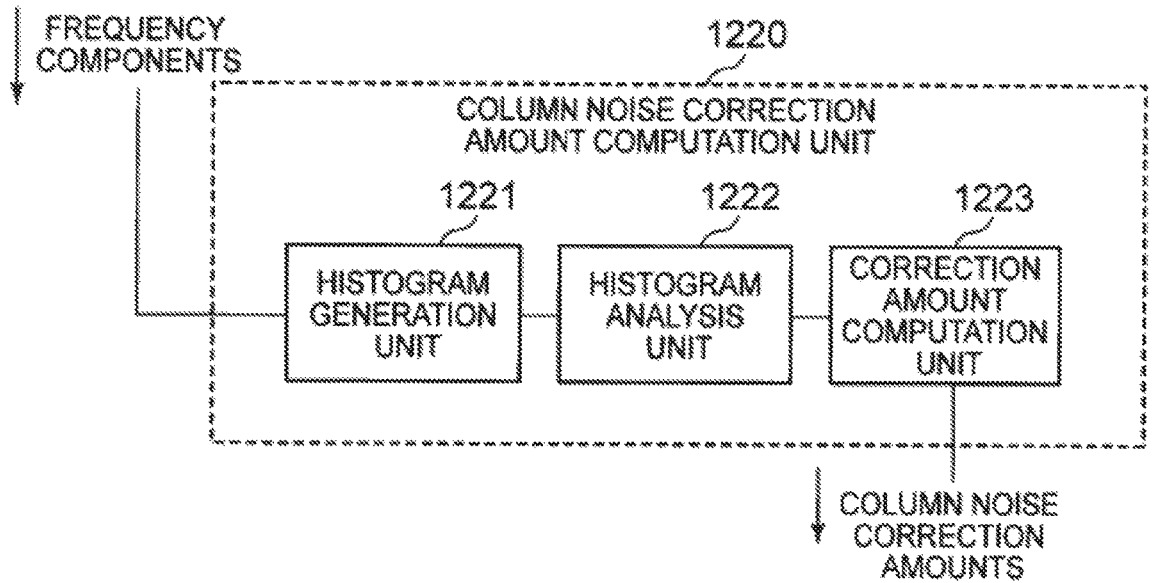
FIG. 4 is a block diagram showing an exemplary configuration of a column noise correction amount computation unit 1220 of the first embodiment.

FIG. 4 is a block diagram showing an exemplary configuration of the column noise correction amount computation unit 1220 of the first embodiment. As shown in FIG. 4, the column noise correction amount computation unit 1220 of the present embodiment has a histogram generation unit 1221, a histogram analysis unit 1222, and a correction amount computation unit 1223.

(Histogram Generation Unit 1221)

The histogram generation unit 1221 receives N frequency component images (pixel values $d_0, d_1, \ldots, d_{N-1}$) from the frequency component decomposition unit 1210. For each of the frequency component images received, the histogram generation unit 1221 generates a histogram of differential pixel values as shown in FIG. 5 for each column.

Figure 5:
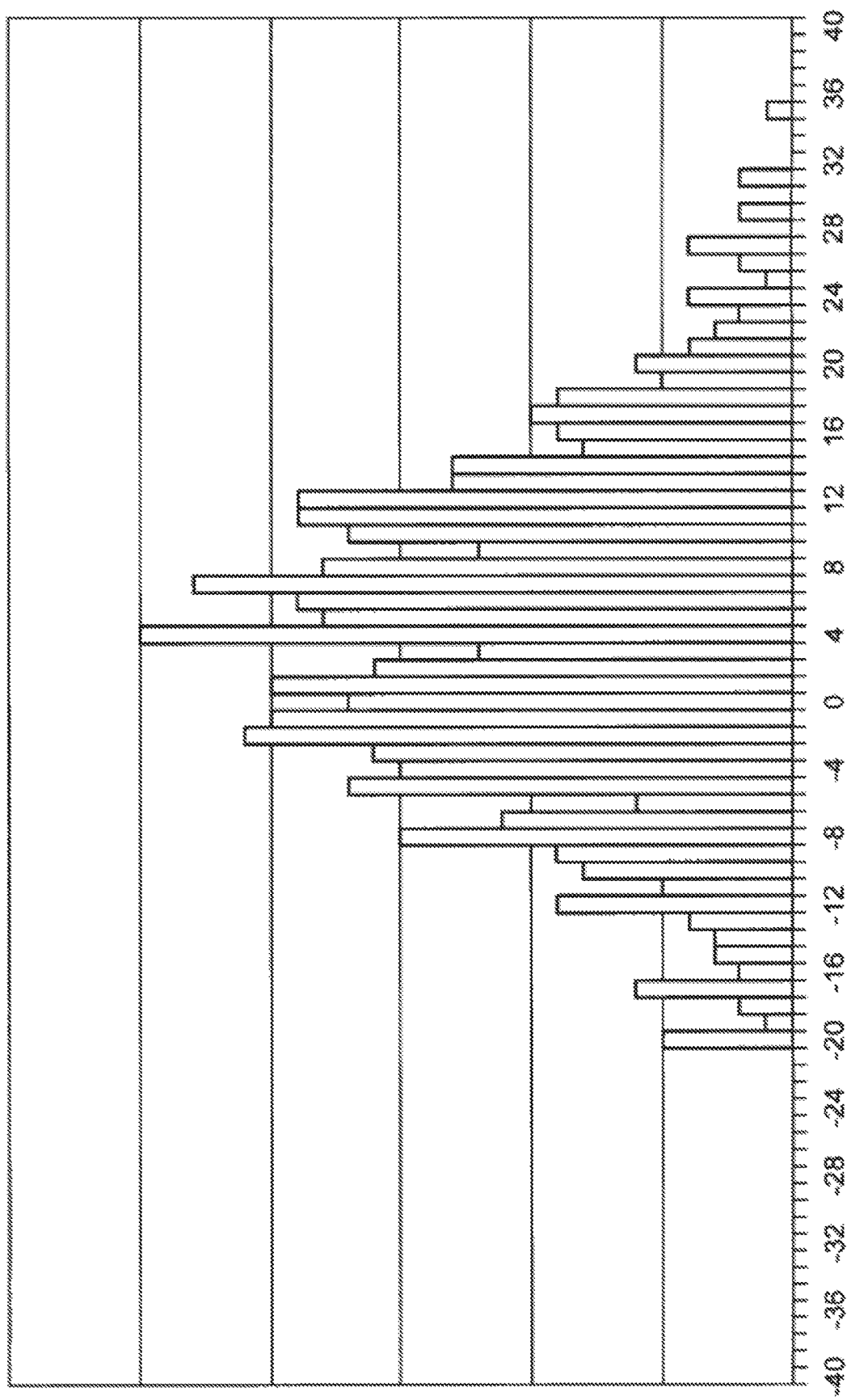
FIG. 5 is an explanatory diagram showing an example of a histogram generated by a histogram generation unit 1221.

FIG. 5 is an explanatory diagram showing an example of the histogram generated by the histogram generation unit 1221. When generating a histogram, the histogram generation unit 1221 may change the number of bins (the number of intervals in the histogram) as appropriate in accordance with the bit precision of the input image.

In the case of the differential histogram as shown in FIG. 5, the range the differential pixel values may take is from −255 to 255. Accordingly, the number of bins needs to be set to 511 to allow the histograms to be generated to cover all the differential pixel values.

In the case where the column for which a histogram is to be generated falls within a flat region in the image where the changes of pixel values are small, in the generated histogram, the offset value $\beta_{col}(j)$ caused by column noise becomes the greatest in frequency.

When the method described in PTL 1 is used, the cost of cumulative addition for generating histograms increases in proportion to the reference pixel range in which the differential computation is performed. In the cumulative addition in the present embodiment, the number of times of addition performed is equal to the number of pixels in the vertical direction of the image per column, so the cost of the cumulative addition becomes low as compared to the case where the method described in PTL 1 is used.

The histogram generation unit 1221 inputs the histograms generated for the respective columns of the frequency component images to the histogram analysis unit 1222. When the input image has J columns, the histogram generation unit 1221 generates (N×J) histograms.

(Histogram Analysis Unit 1222)

The histogram analysis unit 1222 analyzes the histograms received from the histogram generation unit 1221 to compute, for each column, first column noise correction amounts for the respective frequency bands. As the first column noise correction amount, a statistical quantity such as a median, a mean, or a mode of the histogram, for example, is used.

For example, the histogram analysis unit 1222 computes first column noise correction amounts $c_0(j), c_1(j), \ldots, c_{N-1}(j)$ relative to a predetermined column of the input image, from the respective histograms of the frequency components. The histogram analysis unit 1222 inputs the computed first column noise correction amounts relative to each column to the correction amount computation unit 1223.

(Correction Amount Computation Unit 1223)

The correction amount computation unit 1223 uses the first column noise correction amounts $c_0(j), c_1(j), \ldots, c_{N-1}(j)$ received from the histogram analysis unit 1222 to compute a noise correction amount $c(j)$ in the column. The correction amount computation unit 1223 computes the noise correction amount $c(j)$ by summing the first column noise correction amounts over the frequency bands, as shown by the following expression (7), for example.

[Math. 5]

$$c(j) = \sum_{k \in \{0, 1, \ldots, N-1\}} c_k(j) \qquad \text{Expression (7)}$$

Through the above processing, the column noise correction amount computation unit 1220 is able to compute the column noise correction amount of each column by using a plurality of frequency component images obtained as the frequency components included in the input image are decomposed into the plurality of bands. The correction amount computation unit 1223 inputs the noise correction amount $c(j)$ in the column, obtained in the above-described manner, to the column noise correction unit 1230.

(Column Noise Correction Unit 1230)

The column noise correction unit 1230 uses the pixel value y of the input image and the received noise correction amount $c(j)$ in the column, to generate a pixel value $x_{out}$ of the output image as shown by the following expression (8).

$$x_{out}(i,j) = y(i,j) - c(j) \qquad \text{Expression (8)}$$

The column noise correction unit 1230 inputs the output image thus generated, to the image output unit 1300.

[Description of Operation]

Figure 6:
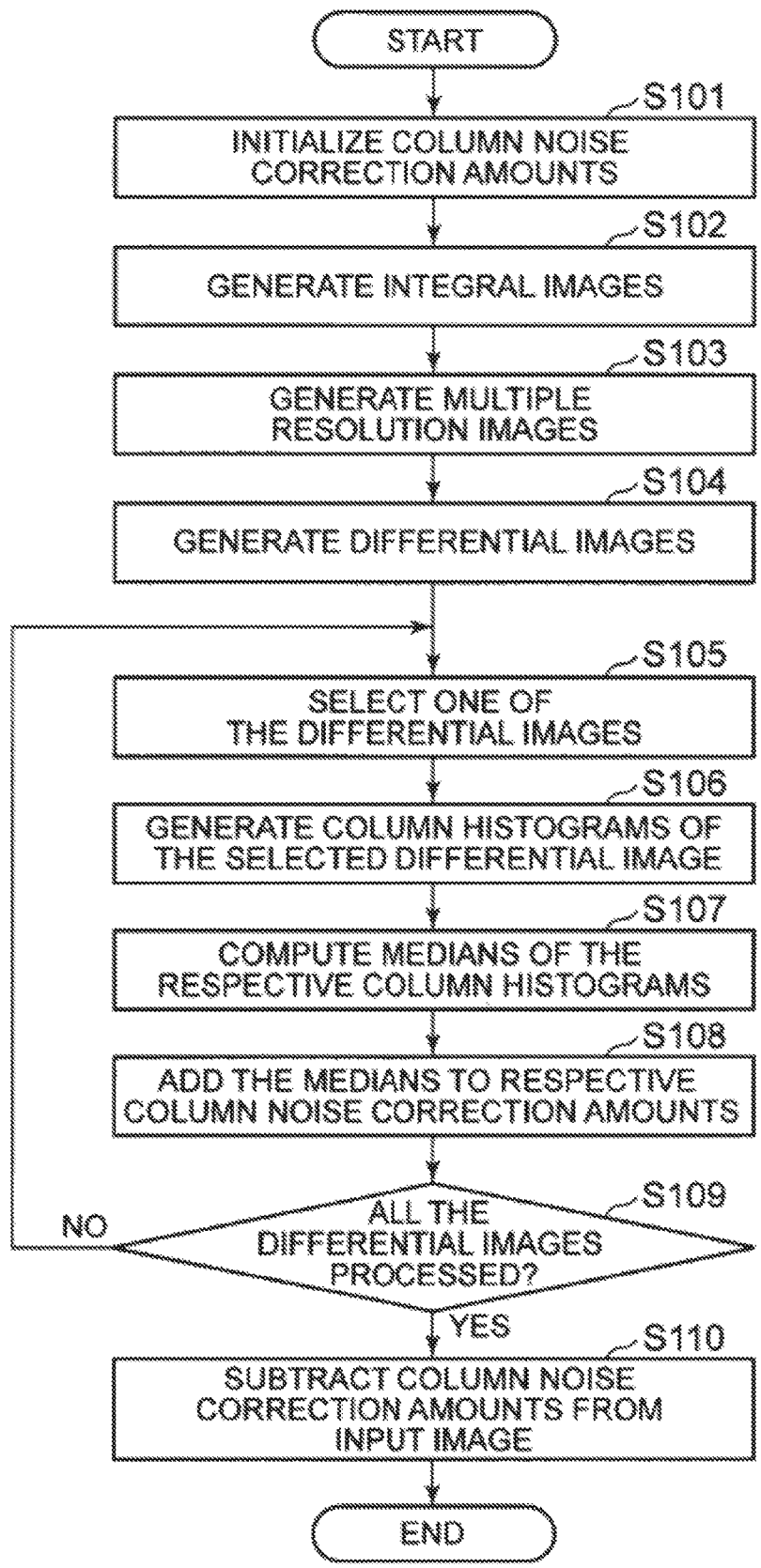
FIG. 6 is a flowchart showing an operation of image processing by the image processing apparatus 1000 of the first embodiment.

The operation of the image processing apparatus 1000 of the present embodiment will be described below with reference to FIG. 6. FIG. 6 is a flowchart showing the operation of image processing by the image processing apparatus 1000 of the first embodiment.

Firstly, the column noise correction unit 1230 initializes the column noise correction amounts in the respective columns to 0 (step S101).

Subsequently, the image input unit 1100 inputs an input image to the image processing unit 1200. For the input image input to the frequency component decomposition unit 1210, the multiple resolution image generation unit 1211 generates an integral image for each row of the input image (step S102).

Subsequently, the multiple resolution image generation unit 1211 uses the integral images generated in the step S102 to generate a plurality of images having different resolutions in the row direction (step S103). The multiple resolution image generation unit 1211 inputs the generated images to the differential image generation unit 1212.

Subsequently, the differential image generation unit 1212 generates a differential image of two images closest in row-direction resolution among the plurality of images having different resolutions in the row direction generated in the step S103 (step S104). The differential image generation unit 1212 inputs the generated differential images to the column noise correction amount computation unit 1220.

Subsequently, the histogram generation unit 1221 selects one of the differential images generated in the step S104 (step S105). For each column of the selected differential image, the histogram generation unit 1221 generates a histogram of differential pixel values (step S106). The histogram generation unit 1221 inputs the generated histograms for the respective columns to the histogram analysis unit 1222.

Subsequently, the histogram analysis unit 1222 computes a median of the input histogram of each column as a statistical quantity (step S107). The histogram analysis unit 1222 inputs the computed medians to the correction amount computation unit 1223.

Subsequently, the correction amount computation unit 1223 adds the computed medians for the respective columns to the corresponding column noise correction amounts (step S108).

Subsequently, the column noise correction amount computation unit 1220 confirms whether the processing in the steps S105 to S108 has been performed on all of the generated differential images (step S109). If there is a differential image for which the processing is yet to be performed (No in step S109), the column noise correction amount computation unit 1220 performs the processing of the step S105 again.

When the processing has been performed on all the differential images (Yes in step S109), the correction amount computation unit 1223 inputs the computed column noise correction amounts in the respective columns to the column noise correction unit 1230.

Subsequently, the column noise correction unit 1230 generates an output image by subtracting the computed column noise correction amounts from the pixel values of the input image (step S110). With the output image generated, the image processing apparatus 1000 finishes the image processing.

It should be noted that the processing in the steps S105 to S108 is performed successively for the respective differential images. However, as the processing on a differential image is independent from the processing on another differential image, the processing in the steps S105 to S108 for two or more differential images may be performed in parallel.

[Description of Advantageous Effects]

The image processing apparatus 1000 of the present embodiment decomposes the frequency components included in an input image into frequency bands, generates a histogram of each column for each image of the decomposed frequency components, computes column noise correction amounts on the basis of the analysis results of the generated histograms, and corrects the input image by using the computed column noise correction amounts.

The frequency component decomposition unit 1210 is capable of decomposing the frequency components into frequency bands, by performing simple computations as shown in the expressions (4) to (6). That is to say, in the present embodiment, the frequency component decomposition is carried out at low cost.

Further, column noise in various frequency bands can be estimated without performing repetitive processing requiring high computational costs, such as the case of using an output image as an input image for succeeding processing as in the method described in PTL 1. Accordingly, the image processing apparatus 1000 of the present embodiment is able to reduce the computational costs for the entire correction processing.

Second Embodiment

[Description of Configuration]

A second embodiment of the present invention will be described below with reference to the drawings.

(Image Processing Apparatus 1000 of Second Embodiment)

In the first embodiment, in a case where an edge exists in a most part of a column, the computed correction amount may include an influence of the edge. The edge refers to a boundary with a certain length among the boundaries of regions where the change in pixel value is large.

Column noise correction performed by an image processing apparatus 1000 using a correction amount including the influence of an edge will cause a problem that the edge in the output image is weakened. The image processing apparatus 1000 of the present embodiment solves this problem by a correction amount computation unit 1223 that computes column noise correction amounts by using threshold parameters as well.

Figure 7:
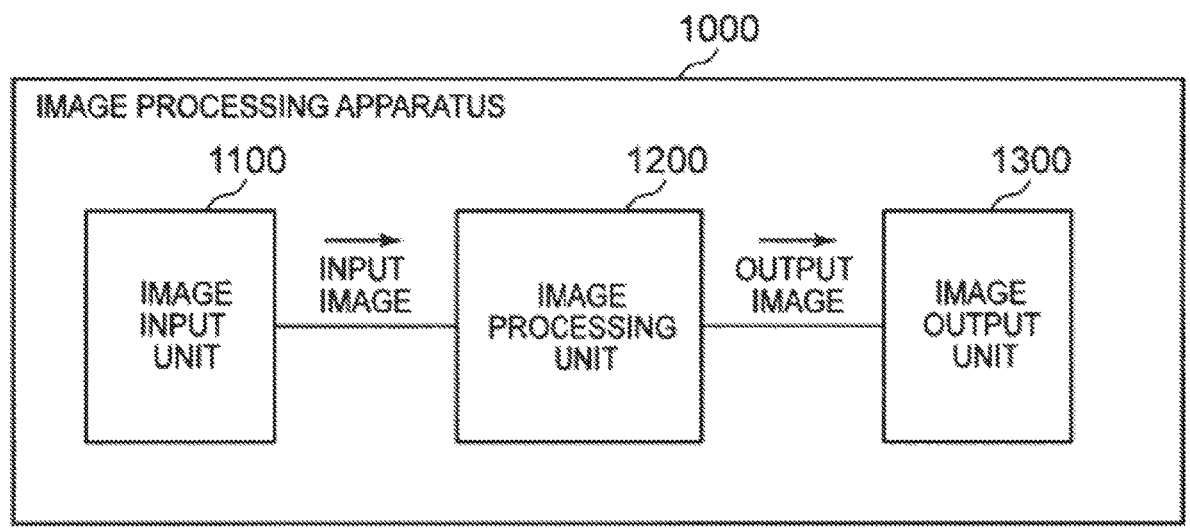
FIG. 7 is a block diagram showing an exemplary configuration of a second embodiment of the image processing apparatus according to the present invention.

FIG. 7 is a block diagram showing an exemplary configuration of the second embodiment of the image processing apparatus according to the present invention. As shown in FIG. 7, the image processing apparatus 1000 of the present embodiment includes an image input unit 1100, an image processing unit 1200, and an image output unit 1300, as with the image processing apparatus 1000 of the first embodiment.

The image input unit 1100 of the present embodiment has a similar function as the image input unit 1100 of the first embodiment. The image output unit 1300 of the present embodiment has a similar function as the image output unit 1300 of the first embodiment.

The image processing unit 1200 of the present embodiment has another function besides the function of the image processing unit 1200 of the first embodiment. A description will now be given of the configuration and operation of the image processing unit 1200 of the present embodiment.

Figure 8:
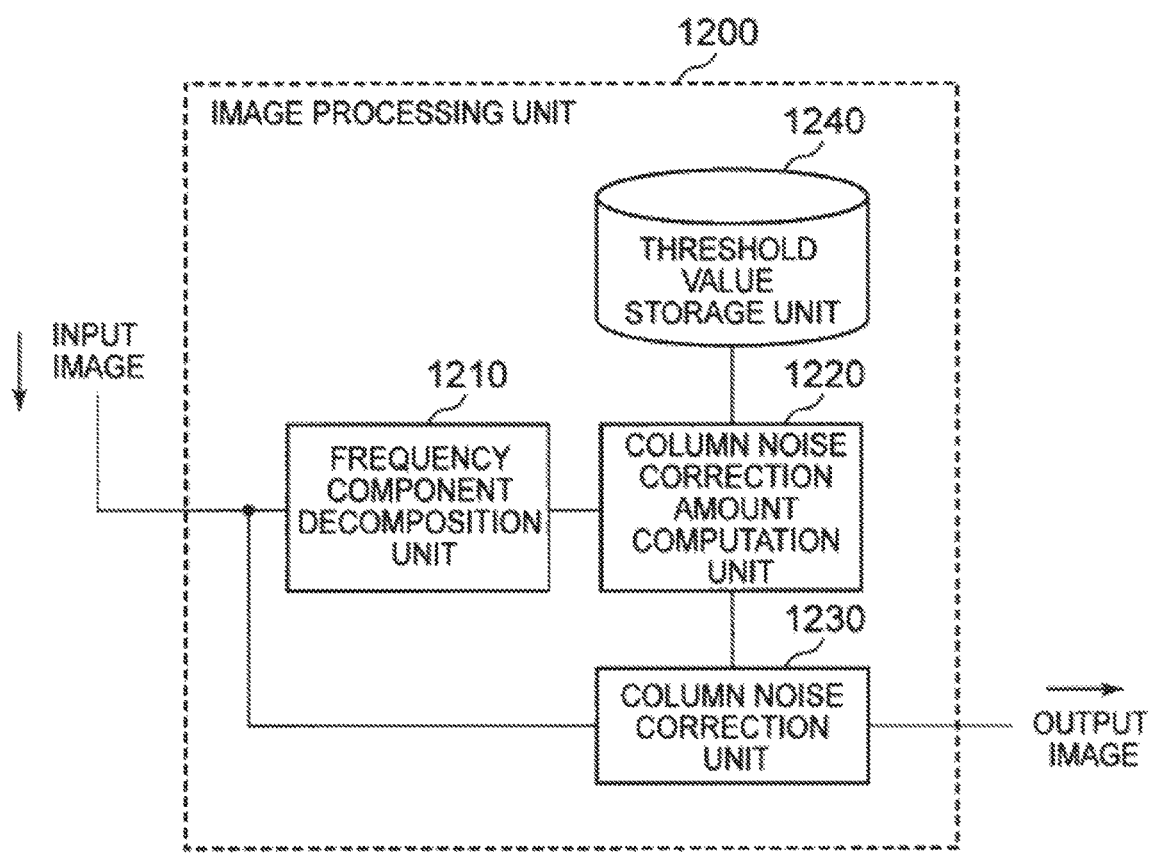
FIG. 8 is a block diagram showing an exemplary configuration of an image processing unit 1200 of the second embodiment.

FIG. 8 is a block diagram showing an exemplary configuration of the image processing unit 1200 of the second embodiment. As shown in FIG. 8, the image processing unit 1200 of the present embodiment includes a frequency component decomposition unit 1210, a column noise correction amount computation unit 1220, and a column noise correction unit 1230, as with the image processing unit 1200 of the first embodiment.

Further, as shown in FIG. 8, unlike the image processing unit 1200 of the first embodiment, the image processing unit 1200 of the present embodiment includes a threshold value storage unit 1240. A description will now be given of the operation of the column noise correction amount computation unit 1220 of the present embodiment, different from the column noise correction amount computation unit 1220 of the first embodiment, and the operation of the threshold value storage unit 1240.

The column noise correction amount computation unit 1220 uses pixel values of the images of the frequency components included in the input image and decomposed into bands, received from the frequency component decomposition unit 1210, and predetermined threshold values received from the threshold value storage unit 1240, to compute column noise correction amounts for the respective bands.

The column noise correction amount computation unit 1220 inputs the computed column noise correction amounts to the column noise correction unit 1230. A specific operation of the column noise correction amount computation unit 1220 of the present embodiment will now be described.

(Column Noise Correction Amount Computation Unit 1220)

Figure 9:
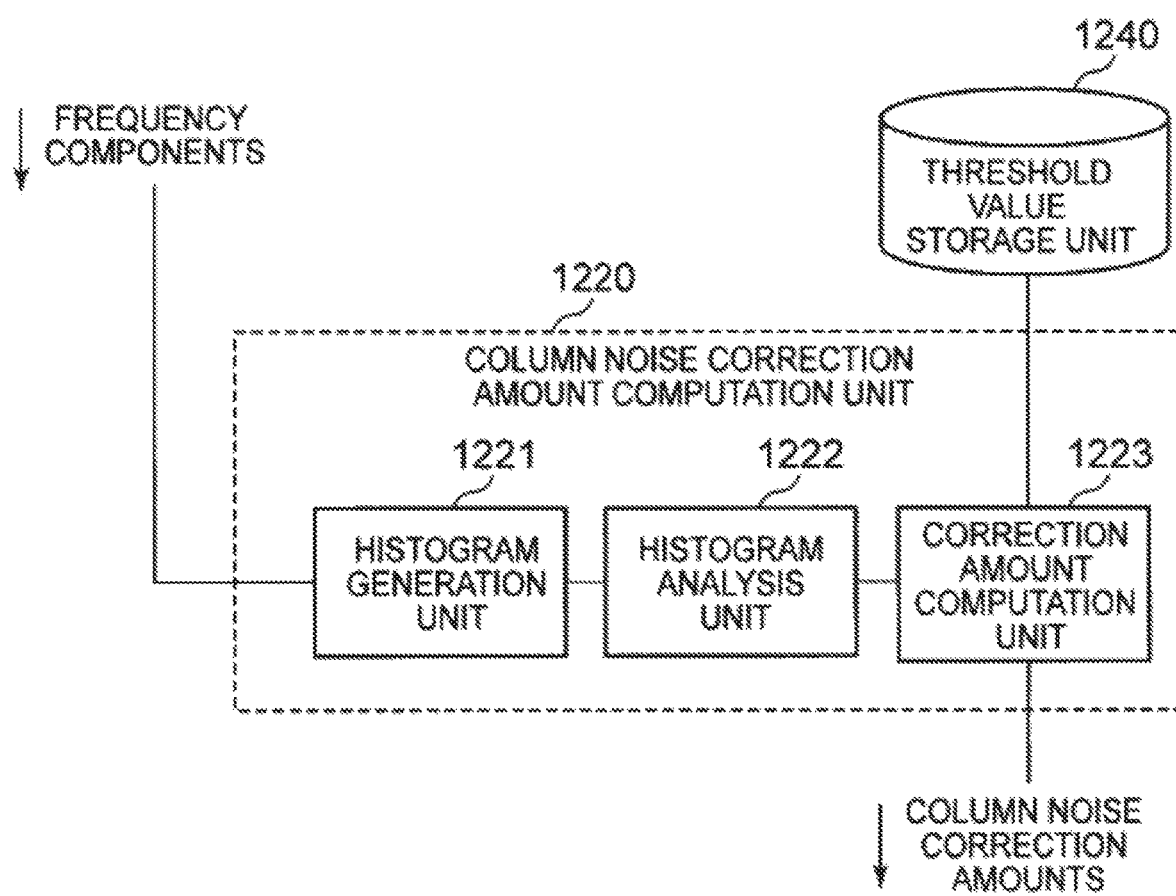
FIG. 9 is a block diagram showing an exemplary configuration of a column noise correction amount computation unit 1220 of the second embodiment.

FIG. 9 is a block diagram showing an exemplary configuration of the column noise correction amount computation unit 1220 of the second embodiment. As shown in FIG. 9, the column noise correction amount computation unit 1220 of the present embodiment has a histogram generation unit 1221, a histogram analysis unit 1222, and a correction amount computation unit 1223.

The histogram generation unit 1221 of the present embodiment has a similar function as the histogram generation unit 1221 of the first embodiment. The histogram analysis unit 1222 of the present embodiment has a similar function as the histogram analysis unit 1222 of the first embodiment.

The correction amount computation unit 1223 of the present embodiment computes a noise correction amount c(j) in a column by using the first column noise correction amounts $c_0(j), c_1(j), \ldots, c_{N-1}(j)$ received from the histogram analysis unit 1222 and predetermined threshold values $\tau_0, \tau_1, \ldots, \tau_{N-1}$ received from the threshold value storage unit 1240.

The correction amount computation unit 1223 computes the noise correction amount c(j) by using only the first column noise correction amount(s) of the frequency components less than the threshold value, as shown by the following expression (9), for example.

[Math. 6]

$$c(j) = \sum_k c'_k(j), \text{ where}$$

$$c'_k(j) = \begin{cases} c_k(j) & |c_k(j)| < \tau_k \\ 0 & \text{otherwise} \end{cases}$$

Expression (9)

By computing the noise correction amount in accordance with the expression (9), the correction amount computation unit 1223 is able to avoid the edge loss which may occur in the correction processing performed on a column that includes an edge in its most part.

It should be noted that the expression to be used by the correction amount computation unit 1223 to compute the noise correction amount is not limited to the expression (9). The correction amount computation unit 1223 may compute the noise correction amount c(j), as shown for example by the following expression (10), by applying clipping processing which is processing of correcting a first column noise correction amount having a large value, as in the case of the expression (9).

[Math. 7]

$$c(j) = \sum_k c'_k(j), \text{ where}$$

$$c'_k(j) = \begin{cases} \tau_k & c_k(j) > \tau_k \\ -\tau_k & c_k(j) < -\tau_k \\ c_k(j) & \text{otherwise} \end{cases}$$

Expression (10)

As shown in the expression (10), the clipping processing is processing of setting a maximum value and a minimum value for the values that pixels may take, and correcting any pixel value to be processed greater than the maximum value to the maximum value and any pixel value to be processed smaller than the minimum value to the minimum value.

Through the above processing, the column noise correction amount computation unit 1220 is able to compute the column noise correction amounts by using a plurality of frequency component images obtained as the frequency components included in the input image are decomposed into the plurality of bands, and the predetermined threshold parameters.

[Description of Operation]

Figure 10:
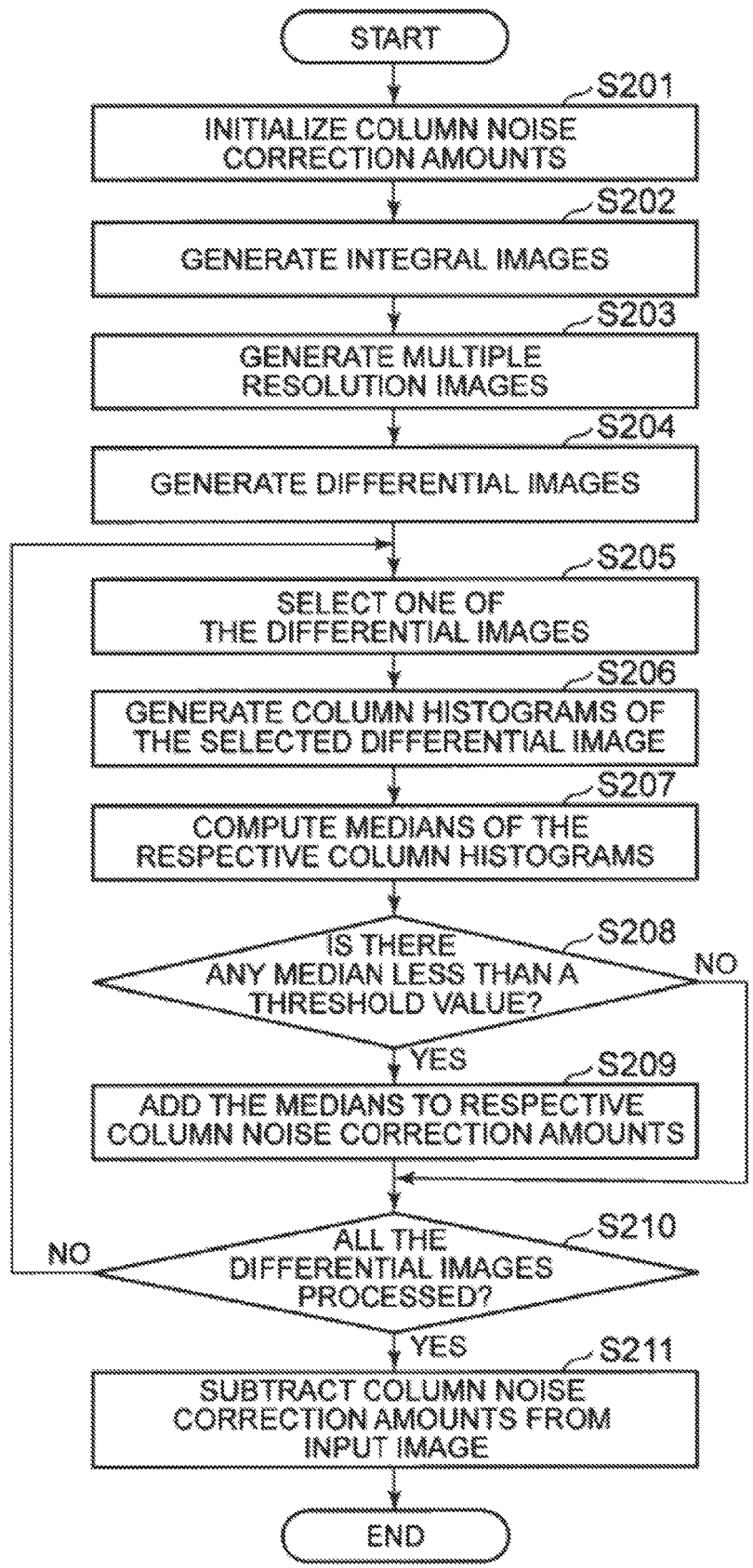
FIG. 10 is a flowchart showing an operation of image processing by the image processing apparatus 1000 of the second embodiment.

The operation of the image processing apparatus 1000 of the present embodiment will now be described with reference to FIG. 10. FIG. 10 is a flowchart showing the operation of image processing by the image processing apparatus 1000 of the second embodiment.

Steps S201 to S206 are identical in processing to the steps S101 to S106, respectively, shown in FIG. 6.

The histogram analysis unit 1222 computes a median of the received histogram of each column as a statistical quantity (step S207). The histogram analysis unit 1222 inputs the computed medians to the correction amount computation unit 1223.

Subsequently, the correction amount computation unit 1223 confirms whether there is any median less than a threshold value among the computed medians of the respective columns (step S208).

If there is any median less than the threshold value (Yes in step S208), the correction amount computation unit 1223 adds the median(s) less than the threshold value to the corresponding column noise correction amount(s) (step S209).

If there is no median less than the threshold value (No in step S208), the correction amount computation unit 1223 advances the process to step S210.

Steps S210 and S211 are identical in processing to the steps S109 and S110, respectively, shown in FIG. 6.

[Description of Advantageous Effects]

The image processing apparatus 1000 of the present embodiment is capable of performing column noise correction processing while preserving an edge even in the case where the edge exists in a most part of the column. The reason is that the correction amount computation unit 1223 is able to compute the column noise correction amount by omitting any correction amount equal to or greater than the value corresponding to the edge. Further, the image processing apparatus 1000 of the present embodiment is able to reduce the computational costs for the column noise correction processing, as in the case of the first embodiment.

Third Embodiment

[Description of Configuration]

A third embodiment of the present invention will now be described with reference to the drawings.

(Image Processing Apparatus 1000 of Third Embodiment)

In the image processing apparatus 1000 of the first embodiment and the image processing apparatus 1000 of the second embodiment, it is assumed to process a single image. Therefore, when a moving image is processed, column noise may be suppressed excessively, leading to occurrence of flickering in the output moving image.

Flickering is an event that pixel values vary regularly in a certain range for each image frame. When the mean of the pixel values for one column of an image varies frame by frame, flickering becomes sufficiently visible.

Generally, fixed pattern noise does not change in a short period of time. However, when the objects captured in a moving image are shifting, the image processing apparatus 1000 of the first embodiment and the image processing apparatus 1000 of the second embodiment may fail to estimate the fixed pattern noise. Failure in estimation of the fixed pattern noise may lead to occurrence of the above-described event that the mean of the pixel values for one column varies frame by frame, or, flickering.

The image processing apparatus 1000 of the present embodiment solves this problem by a correction amount computation unit 1223 that computes column noise correction amounts by using threshold parameters and correction amounts relative to the immediately preceding frame as well.

Figure 11:
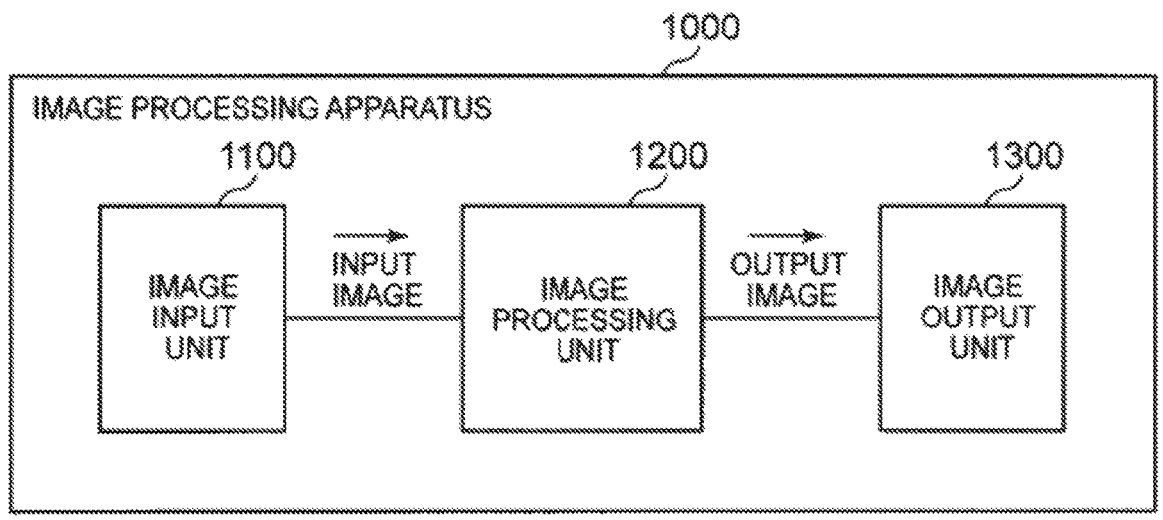
FIG. 11 is a block diagram showing an exemplary configuration of a third embodiment of the image processing apparatus according to the present invention.

FIG. 11 is a block diagram showing an exemplary configuration of the third embodiment of the image processing apparatus according to the present invention. As shown in FIG. 11, the image processing apparatus 1000 of the present embodiment includes an image input unit 1100, an image processing unit 1200, and an image output unit 1300, as with the image processing apparatus 1000 of the first embodiment.

The image input unit 1100 of the present embodiment has a similar function as the image input unit 1100 of the first embodiment. The image output unit 1300 of the present embodiment has a similar function as the image output unit 1300 of the first embodiment.

The image processing unit 1200 of the present embodiment has another function besides the function of the image processing unit 1200 of the second embodiment. A description will now be given of the configuration and operation of the image processing unit 1200 of the present embodiment.

Figure 12:
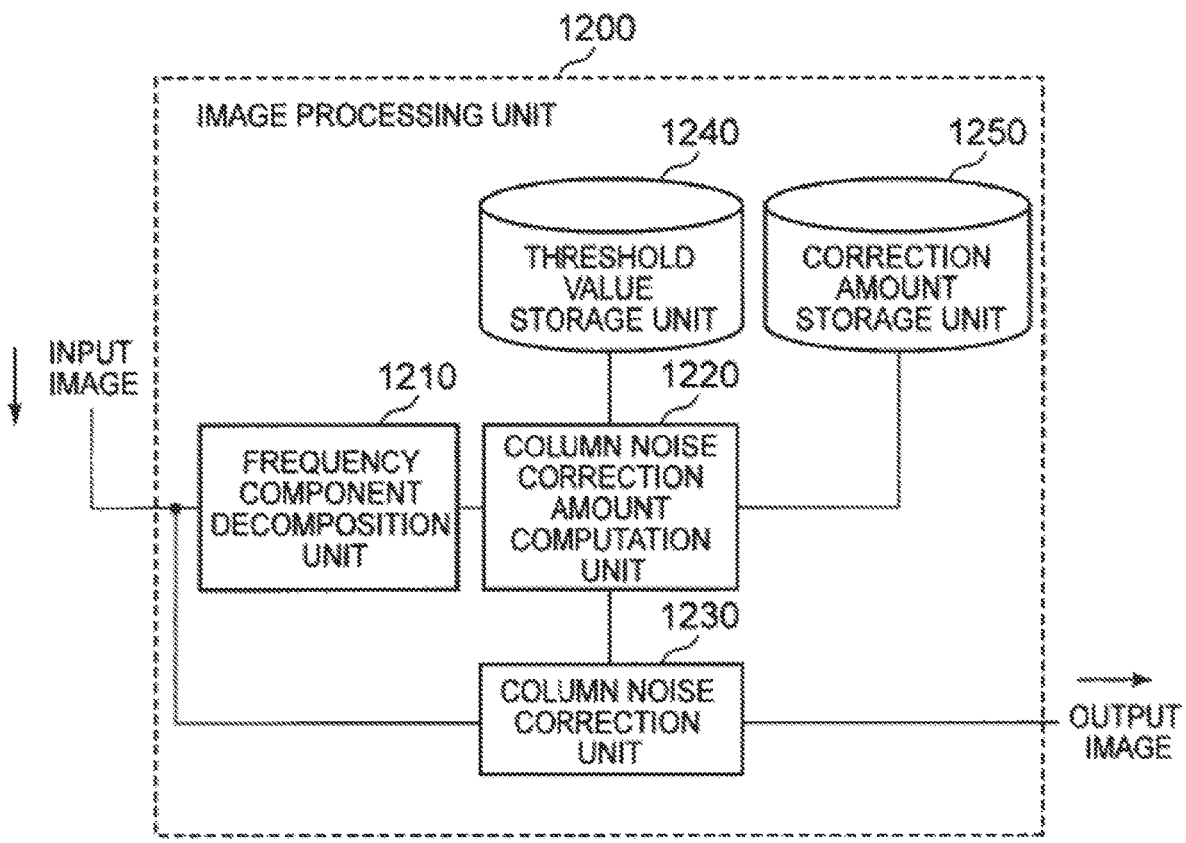
FIG. 12 is a block diagram showing an exemplary configuration of an image processing unit 1200 of the third embodiment.

FIG. 12 is a block diagram showing an exemplary configuration of the image processing unit 1200 of the third embodiment. As shown in FIG. 12, the image processing unit 1200 of the present embodiment includes a frequency component decomposition unit 1210, a column noise correction amount computation unit 1220, a column noise correction unit 1230, and a threshold value storage unit 1240, as with the image processing unit 1200 of the second embodiment.

Further, as shown in FIG. 12, unlike the image processing unit 1200 of the second embodiment, the image processing unit 1200 of the present embodiment includes a correction amount storage unit 1250. A description will now be given of the operation of the column noise correction amount computation unit 1220 of the present embodiment, which is different from the column noise correction amount computation unit 1220 of the second embodiment, and the operations of the threshold value storage unit 1240 and the correction amount storage unit 1250.

The column noise correction amount computation unit 1220 uses pixel values of the images of the frequency components included in the input image and decomposed into bands, received from the frequency component decomposition unit 1210, predetermined threshold values received from the threshold value storage unit 1240, and correction amounts relative to the immediately preceding frame, received from the correction amount storage unit 1250, to compute column noise correction amounts for the respective bands.

The column noise correction amount computation unit 1220 inputs the computed column noise correction amounts to the column noise correction unit 1230. A specific operation of the column noise correction amount computation unit 1220 of the present embodiment will now be described.

(Column Noise Correction Amount Computation Unit 1220)

Figure 13:
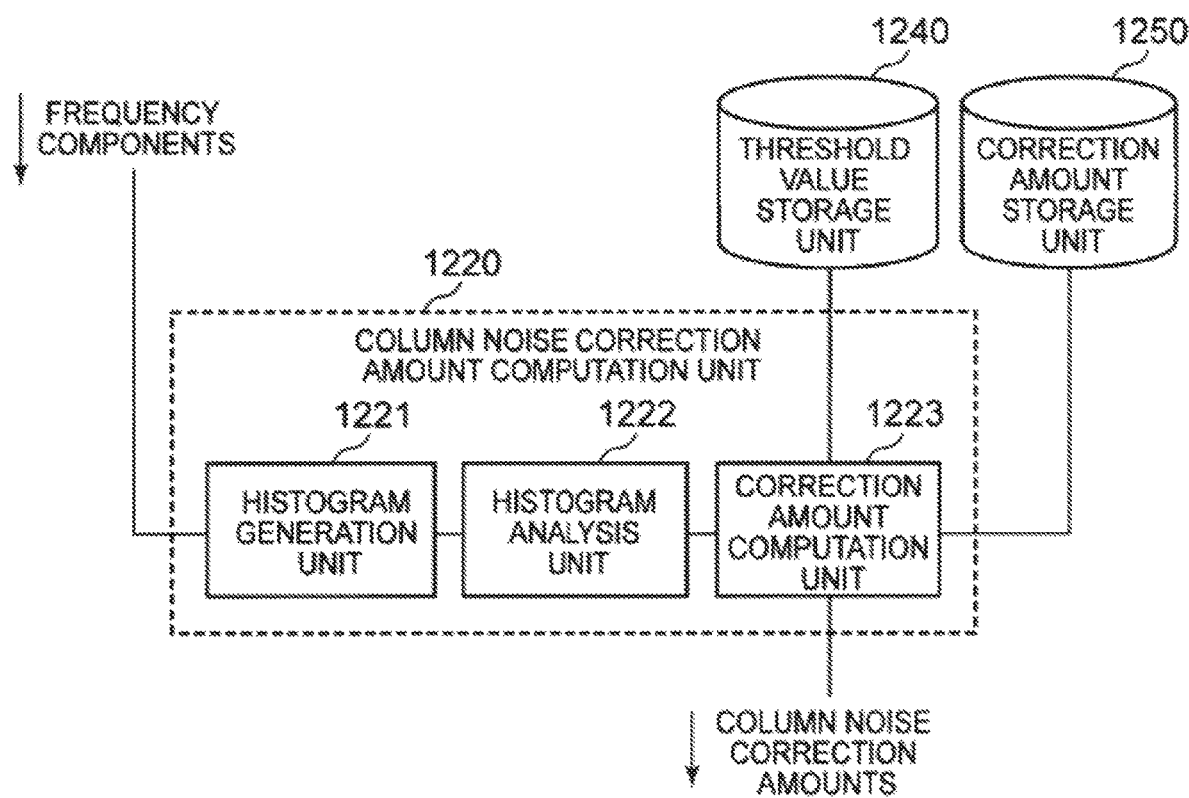
FIG. 13 is a block diagram showing an exemplary configuration of a column noise correction amount computation unit 1220 of the third embodiment.

FIG. 13 is a block diagram showing an exemplary configuration of the column noise correction amount computation unit 1220 of the third embodiment. As shown in FIG. 13, the column noise correction amount computation unit 1220 of the present embodiment has a histogram generation unit 1221, a histogram analysis unit 1222, and a correction amount computation unit 1223.

The histogram generation unit 1221 of the present embodiment has a similar function as the histogram generation unit 1221 of the first embodiment. The histogram analysis unit 1222 of the present embodiment has a similar function as the histogram analysis unit 1222 of the first embodiment.

The correction amount computation unit 1223 of the present embodiment receives first column noise correction amounts $c_0(j), c_1(j), \ldots, c_{N-1}(j)$ for the current frame from the histogram analysis unit 1222, and predetermined threshold values $\xi_0, \xi_1, \ldots, \xi_{N-1}$ from the threshold value storage unit 1240. Further, the correction amount computation unit 1223 receives correction amounts $c_0^{prev}(j), c_1^{prev}(j), \ldots, c_{N-1}^{prev}(j)$ for the respective bands relative to the immediately preceding frame, from the correction amount storage unit 1250. The correction amount computation unit 1223 uses the received information to compute the noise correction amount $c(j)$ in the column.

The correction amount computation unit 1223 computes the noise correction amount $c(j)$ by using only the first column noise correction amount(s) of the frequency components for which the difference between the first column noise correction amount for the current frame and the correction amount for the previous frame is less than a threshold value, as shown by the following expression (11), for example.

[Math. 8]

$$c(j) = \sum_k c'_k(j), \text{ where} \quad \text{Expression (11)}$$

$$c'_k(j) = \begin{cases} c_k(j) & |c_k(j) - c_k^{prev}(j)| < \xi_k \\ 0 & \text{otherwise} \end{cases}$$

By computing the noise correction amount in accordance with the expression (11), the correction amount computation unit 1223 is able to suppress the column noise while restricting the occurrence of flickering even in the case where the processing target is a moving image.

It should be noted that the expression used by the correction amount computation unit 1223 to compute the noise correction amount is not limited to the expression (11). The correction amount computation unit 1223 may compute the noise correction amount c(j), as shown for example by the following expression (12), by applying clipping processing which is processing of correcting the first column noise correction amount for the current frame that has considerably changed from the correction amount for the previous frame, as in the case of the expression (11).

[Math. 9]

$$c(j) = \sum_k c'_k(j), \text{ where} \quad \text{Expression (12)}$$

$$c'_k(j) = \begin{cases} c_k^{prev}(j) + \xi_k & c_k(j) - c_k^{prev}(j) > \xi_k \\ c_k^{prev}(j) - \xi_k & c_k(j) - c_k^{prev}(j) < -\xi_k \\ c_k(j) & \text{otherwise} \end{cases}$$

After computing the noise correction amounts, the correction amount computation unit 1223 stores the correction amounts for the current frame in the correction amount storage unit 1250 by updating the correction amounts for the previous frame to the correction amounts of the respective frequency bands for the current frame, as shown by the following expression (13).

[Math. 10]

$$c_k^{prev}(j) \leftarrow c'_k(j), \text{ where} \quad \text{Expression (13)}$$

$$c'_k(j) = \begin{cases} c_k(j) & |c_k(j) - c_k^{prev}(j)| < \xi_k \\ 0 & \text{otherwise} \end{cases}$$

It should be noted that the expression used by the correction amount computation unit 1223 for the storing processing is not limited to the expression (13). In the case where the clipping processing is applied as the processing for correcting the first column noise correction amounts, the correction amount computation unit 1223 may use the following expression (14), for example, in the storing processing.

[Math. 11]

$$c_k^{prev}(j) \leftarrow c'_k(j), \text{ where} \quad \text{Expression (14)}$$

$$c'_k(j) = \begin{cases} c_k^{prev}(j) + \xi_k & c_k(j) - c_k^{prev}(j) > \xi_k \\ c_k^{prev}(j) - \xi_k & c_k(j) - c_k^{prev}(j) < -\xi_k \\ c_k(j) & \text{otherwise} \end{cases}$$

Through the above processing, the column noise correction amount computation unit 1220 is able to compute the column noise correction amounts by using a plurality of frequency component images obtained as the frequency components included in the input image are decomposed into the plurality of bands, the predetermined threshold parameters, and the correction amounts relative to the immediately preceding frame.

[Description of Operation]

Figure 14:
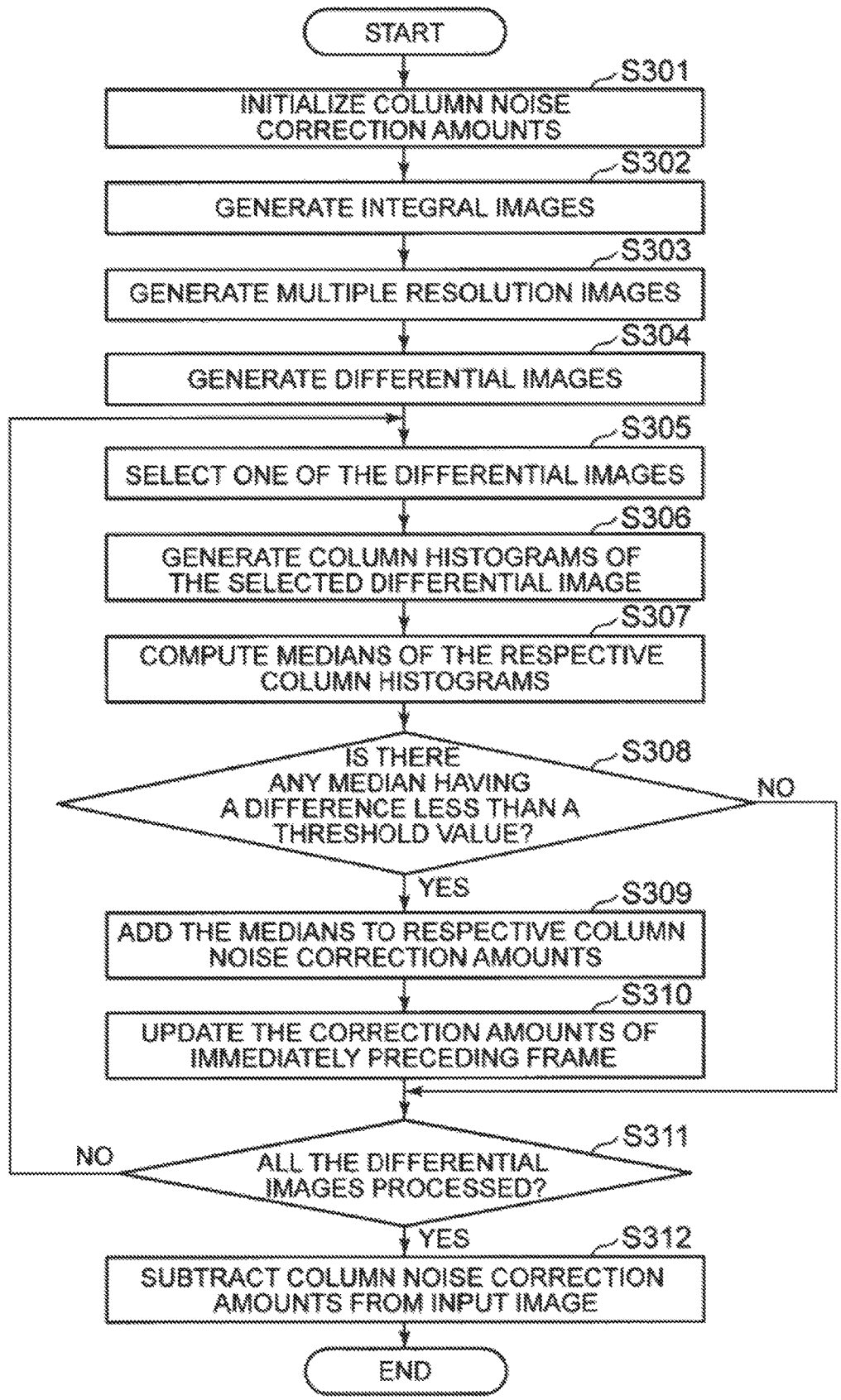
FIG. 14 is a flowchart showing an operation of image processing by the image processing apparatus 1000 of the third embodiment.

The operation of the image processing apparatus 1000 of the present embodiment will now be described with reference to FIG. 14. FIG. 14 is a flowchart showing the operation of image processing by the image processing apparatus 1000 of the third embodiment.

Steps S301 to S306 are identical in processing to the steps S101 to S106, respectively, shown in FIG. 6.

The histogram analysis unit 1222 computes a median of the received histogram of each column as a statistical quantity (step S307). The histogram analysis unit 1222 inputs the computed medians to the correction amount computation unit 1223.

Subsequently, the correction amount computation unit 1223 confirms whether there is any median, among the computed medians of the respective columns, for which the difference with the correction amount relative to the immediately preceding frame is less than a threshold value (step S308).

If there is any median for which the difference is less than the threshold value (Yes in step S308), the correction amount computation unit 1223 adds the median(s) computed and ascertained as such, to the corresponding column noise correction amount(s) (step S309). Subsequently, the correction amount computation unit 1223 updates the correction amounts relative to the immediately preceding fame by using the medians computed for the current frame (step S310).

If there is no median for which the difference is less than the threshold value (No in step S308), the correction amount computation unit 1223 advances the process to step S311.

Steps S311 and S312 are identical in processing to the steps S109 and S110, respectively, shown in FIG. 6.

[Description of Advantageous Effects]

The image processing apparatus 1000 of the present embodiment is capable of suppressing flickering that may occur when a processing target is a moving image, by taking into consideration that there is a correlation between the offset values or the positions where fixed pattern noise occurs in the consecutive frames. The reason is that the correction amount computation unit 1223 is able to compute the column noise correction amount by omitting any correction amount for which the difference with the correction amount relative to the immediately preceding frame is equal to or greater than the threshold value. Further, the image processing apparatus 1000 of the present embodiment is capable of reducing the computational costs in the column noise correction processing, as in the case of the first embodiment.

It should be noted that the image processing apparatus 1000 of each embodiment is able to perform row noise correction processing besides the column noise correction processing. The row noise correction processing corresponds to the column noise correction processing in each embodiment with the "column" and "row" being replaced with "row" and "column", respectively. Further, the image processing apparatus 1000 of each embodiment is able to perform the column noise correction processing and the row noise correction processing independently from each other.

The image processing apparatus 1000 of each embodiment is implemented by a central processing unit (CPU) that performs processing in accordance with a program stored in a storage medium, for example. That is to say, the image input unit 1100, the image processing unit 1200, and the image output unit 1300 are implemented for example by the CPU that performs processing in accordance with the program control. Alternatively, only some of the constituent elements of the image processing apparatus 1000 of each embodiment may be implemented by the CPU.

Further, each unit in the image processing apparatus 1000 of each embodiment may be implemented by a hardware circuit. By way of example, the image input unit 1100, the image processing unit 1200, and the image output unit 1300 may each be implemented by corresponding large scale integration (LSI), or they may be implemented by single LSI.

Figure 15:
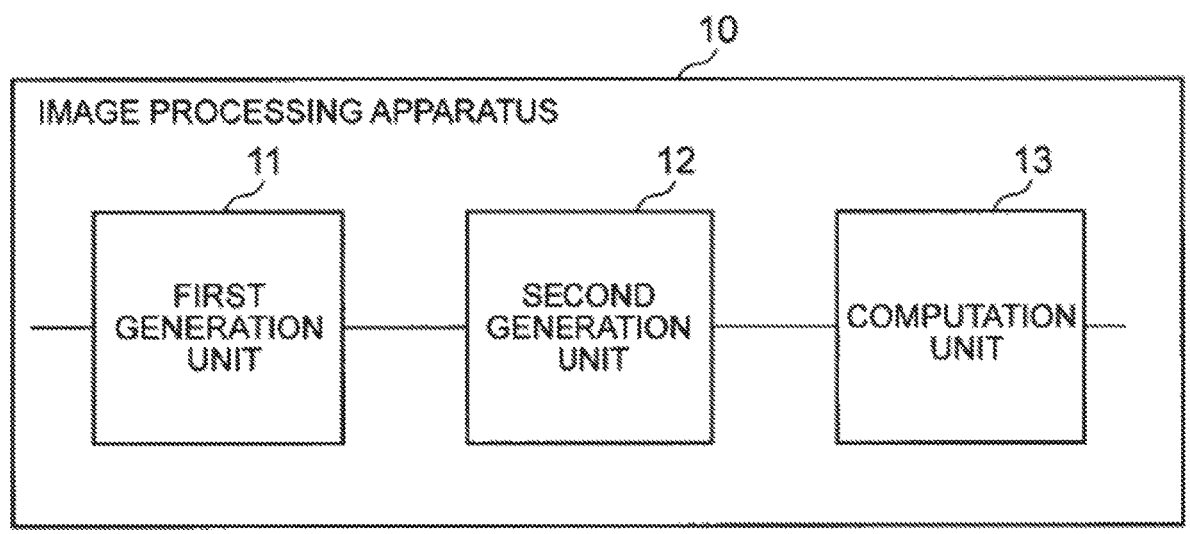
FIG. 15 is a block diagram showing an overview of the image processing apparatus according to the present invention.

The present invention will now be outlined. FIG. 15 is a block diagram showing an overview of the image processing apparatus according to the present invention. The image processing apparatus 10 according to the present invention includes: a first generation unit 11 (for example, multiple resolution image generation unit 1211) which generates a plurality of lower-resolution images having different row-direction resolutions by changing a resolution in a row direction of an image to be processed to a plurality of lower resolutions; a second generation unit 12 (for example, differential image generation unit 1212) which generates a differential image by taking a difference between two of the plurality of lower-resolution images; and a computation unit 13 (for example, histogram analysis unit 1222) which computes a correction amount for the pixel values of a predetermined column of the image to be processed by use of a statistical quantity of the pixel values of a predetermined column of the differential image.

With this configuration, the image processing apparatus is capable of suppressing column noise at various frequencies with low computational costs.

Further, the first generation unit 11 may change the row-direction resolution of the image to be processed by applying a moving average filter, for which an integral image is used, to the image to be processed in the row direction.

With this configuration, the image processing apparatus is capable of further reducing the computational costs at the time of applying the moving average filter.

Further, the image processing apparatus 10 may include a second computation unit (for example, correction amount computation unit 1223) which computes the correction amount for the pixel values of the predetermined column of the image to be processed by use of a plurality of statistical quantities concerning the predetermined column computed respectively from a plurality of differential images including frequency components of different frequency bands.

With this configuration, the image processing apparatus is capable of computing the correction amount allowing the column noise in the plurality of frequency bands to be suppressed.

Further, the second computation unit may compute the correction amount for the pixel values of the predetermined column of the image to be processed by use of any of the plurality of statistical quantities that fulfills a predetermined condition.

With this configuration, the image processing apparatus is capable of suppressing the column noise while preserving the edge included in a most part of the column.

Further, the image to be processed may be one of a plurality of frames constituting a moving image, and the second computation unit may compute the correction amount for the pixel values of the predetermined column of the image to be processed by use of the plurality of statistical quantities and a correction amount computed relative to a frame immediately preceding the image to be processed.

With this configuration, the image processing apparatus is capable of suppressing the column noise in the moving image while restricting the occurrence of flickering.

Further, the image processing apparatus 10 may include a correction unit (for example, column noise correction unit 1230) which corrects the pixel values of the predetermined column of the image to be processed by use of the correction amount, and outputs the corrected image to be processed.

With this configuration, the image processing apparatus is capable of outputting an image in which the identified column noise has been suppressed.

While the present invention has been described with reference to the embodiments and examples, the present invention is not limited to the embodiments or examples above. Various modifications understandable by those skilled in the art can be made to the configurations and details of the present invention within the scope of the present invention.

A part of or all of the above embodiments may also be described as, but not limited to, the following appendices.

(Supplementary note 1) An image processing method comprising: generating a plurality of lower-resolution images having different column-direction resolutions by changing a resolution in a column direction of an image to be processed to a plurality of lower resolutions; generating a differential image by taking a difference between two of the plurality of lower-resolution images; and computing a correction amount for the pixel values of a predetermined row of the image to be processed by use of a statistical quantity of the pixel values of a predetermined row of the differential image.

(Supplementary note 2) The image processing method according to supplementary note 1, comprising: changing the column-direction resolution of the image to be processed by applying a moving average filter, for which an integral image is used, to the image to be processed in the column direction.

(Supplementary note 3) The image processing method according to supplementary note 1 or 2, comprising: computing the correction amount for the pixel values of the predetermined row of the image to be processed by use of a plurality of statistical quantities concerning the predetermined row computed respectively from a plurality of differential images including frequency components of different frequency bands.

(Supplementary note 4) The image processing method according to supplementary note 3, comprising: computing the correction amount for the pixel values of the predetermined row of the image to be processed by use of any of the plurality of statistical quantities that fulfills a predetermined condition.

(Supplementary note 5) The image processing method according to supplementary note 3 or 4, wherein the image to be processed is one of a plurality of frames constituting a moving image, the method comprising: computing the correction amount for the pixel values of the predetermined row of the image to be processed by use of the plurality of statistical quantities and a correction amount computed relative to a frame immediately preceding the image to be processed.

(Supplementary note 6) The image processing method according to any one of supplementary notes 1 to 5, comprising: correcting the pixel values of the predetermined row of the image to be processed by use of the correction amount; and outputting the corrected image to be processed.

(Supplementary note 7) An image processing apparatus comprising: a first generation unit configured to generate a plurality of lower-resolution images having different column-direction resolutions by changing a resolution in a column direction of an image to be processed to a plurality of lower resolutions; a second generation unit configured to generate a differential image by taking a difference between two of the plurality of lower-resolution images;

and a computation unit configured to compute a correction amount for the pixel values of a predetermined row of the image to be processed by use of a statistical quantity of the pixel values of a predetermined row of the differential image.

(Supplementary note 8) The image processing apparatus according to supplementary note 7, wherein the first generation unit is configured to change the column-direction resolution of the image to be processed by applying a moving average filter, for which an integral image is used, to the image to be processed in the column direction.

(Supplementary note 9) An image processing program causing a computer to perform: first generation processing of generating a plurality of lower-resolution images having different column-direction resolutions by changing a resolution in a column direction of an image to be processed to a plurality of lower resolutions; second generation processing of generating a differential image by taking a difference between two of the plurality of lower-resolution images; and computation processing of computing a correction amount for the pixel values of a predetermined row of the image to be processed by use of a statistical quantity of the pixel values of a predetermined row of the differential image.

(Supplementary note 10) The image processing program according to supplementary note 9, causing the computer to perform: changing processing of changing the column-direction resolution of the image to be processed by applying a moving average filter, for which an integral image is used, to the image to be processed in the column direction.

REFERENCE SIGNS LIST 10, 1000 image processing apparatus
11 first generation unit
12 second generation unit
13 computation unit
1100 image input unit
1200 image processing unit
1300 image output unit
1210 frequency component decomposition unit
1211 multiple resolution image generation unit
1212 differential image generation unit
1220 column noise correction amount computation unit
1221 histogram generation unit
1222 histogram analysis unit
1223 correction amount computation unit
1230 column noise correction unit
1240 threshold value storage unit
1250 correction amount storage unit

What is claimed is:

1. An image processing method comprising:
generating a plurality of lower-resolution images having different row-direction resolutions by changing a resolution in a row direction of an image to be processed to a plurality of lower resolutions;
generating a differential image by taking a difference between two of the plurality of lower-resolution images; and
computing a correction amount for pixel values of a predetermined column of the image to be processed by use of a statistical quantity of the pixel values of a predetermined column of the differential image.

2. The image processing method according to claim 1, comprising:
changing the row-direction resolution of the image to be processed by applying a moving average filter, for which an integral image is used, to the image to be processed in the row direction.

3. The image processing method according to claim 1, comprising:
computing the correction amount for the pixel values of the predetermined column of the image to be processed by use of a plurality of statistical quantities concerning the predetermined column computed respectively from a plurality of differential images including frequency components of different frequency bands.

4. The image processing method according to claim 3, comprising:
computing the correction amount for the pixel values of the predetermined column of the image to be processed by use of any of the plurality of statistical quantities that fulfills a predetermined condition.

5. The image processing method according to claim 3, wherein the image to be processed is one of a plurality of frames constituting a moving image,
the method comprising:
computing the correction amount for the pixel values of the predetermined column of the image to be processed by use of the plurality of statistical quantities and a correction amount computed relative to a frame immediately preceding the image to be processed.

6. The image processing method according to claim 1, comprising:
correcting the pixel values of the predetermined column of the image to be processed by use of the correction amount; and
outputting the corrected image to be processed.

7. An image processing apparatus comprising:
a first generation unit, implemented by a processor, configured to generate a plurality of lower-resolution images having different row-direction resolutions by changing a resolution in a row direction of an image to be processed to a plurality of lower resolutions;
a second generation unit, implemented by the processor, configured to generate a differential image by taking a difference between two of the plurality of lower-resolution images; and
a computation unit, implemented by the processor, configured to compute a correction amount for pixel values of a predetermined column of the image to be processed by use of a statistical quantity of the pixel values of a predetermined column of the differential image.

8. The image processing apparatus according to claim 7, wherein
the first generation unit is configured to change the row-direction resolution of the image to be processed by applying a moving average filter, for which an integral image is used, to the image to be processed in the row direction.

9. A non-transitory computer-readable recording medium having recorded therein an image processing program causing a computer to perform:
first generation processing of generating a plurality of lower-resolution images having different row-direction resolutions by changing a resolution in a row direction of an image to be processed to a plurality of lower resolutions;

second generation processing of generating a differential image by taking a difference between two of the plurality of lower-resolution images; and computation processing of computing a correction amount for pixel values of a predetermined column of the image to be processed by use of a statistical quantity of the pixel values of a predetermined column of the differential image.

10. The medium according to claim 9, causing the computer to perform:

changing processing of changing the row-direction resolution of the image to be processed by applying a moving average filter, for which an integral image is used, to the image to be processed in the row direction.

11. The image processing method according to claim 2, comprising:

computing the correction amount for the pixel values of the predetermined column of the image to be processed by use of a plurality of statistical quantities concerning the predetermined column computed respectively from a plurality of differential images including frequency components of different frequency bands.

12. The image processing method according to claim 11, comprising:

computing the correction amount for the pixel values of the predetermined column of the image to be processed by use of any of the plurality of statistical quantities that fulfills a predetermined condition.

13. The image processing method according to claim 4, wherein the image to be processed is one of a plurality of frames constituting a moving image, the method comprising:

computing the correction amount for the pixel values of the predetermined column of the image to be processed by use of the plurality of statistical quantities and a correction amount computed relative to a frame immediately preceding the image to be processed.

14. The image processing method according to claim 11, wherein the image to be processed is one of a plurality of frames constituting a moving image, the method comprising:

computing the correction amount for the pixel values of the predetermined column of the image to be processed by use of the plurality of statistical quantities and a correction amount computed relative to a frame immediately preceding the image to be processed.

15. The image processing method according to claim 12, wherein the image to be processed is one of a plurality of frames constituting a moving image, the method comprising:

computing the correction amount for the pixel values of the predetermined column of the image to be processed by use of the plurality of statistical quantities and a correction amount computed relative to a frame immediately preceding the image to be processed.

16. The image processing method according to claim 2, comprising:

correcting the pixel values of the predetermined column of the image to be processed by use of the correction amount; and outputting the corrected image to be processed.

17. The image processing method according to claim 3, comprising:

correcting the pixel values of the predetermined column of the image to be processed by use of the correction amount; and outputting the corrected image to be processed.

18. The image processing method according to claim 4, comprising:

correcting the pixel values of the predetermined column of the image to be processed by use of the correction amount; and outputting the corrected image to be processed.

19. The image processing method according to claim 5, comprising:

correcting the pixel values of the predetermined column of the image to be processed by use of the correction amount; and outputting the corrected image to be processed.

20. The image processing method according to claim 11, comprising:

correcting the pixel values of the predetermined column of the image to be processed by use of the correction amount; and outputting the corrected image to be processed.

* * * * *